United States Patent
Lee et al.

(10) Patent No.: US 12,510,868 B2
(45) Date of Patent: Dec. 30, 2025

(54) BUILDING EQUIPMENT ENERGY MANAGEMENT CONTROL SYSTEM AND CONTROL THEREFOR

(71) Applicant: LG ELECTRONICS INC., Seoul (KR)

(72) Inventors: Junu Lee, Seoul (KR); Kyeungjae Kim, Seoul (KR); Dohyung Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 563 days.

(21) Appl. No.: 17/791,601

(22) PCT Filed: Jun. 23, 2020

(86) PCT No.: PCT/KR2020/008191
§ 371 (c)(1),
(2) Date: Jul. 8, 2022

(87) PCT Pub. No.: WO2021/141189
PCT Pub. Date: Jul. 15, 2021

(65) Prior Publication Data
US 2023/0040886 A1    Feb. 9, 2023

(30) Foreign Application Priority Data
Jan. 8, 2020   (KR) .................. 10-2020-0002647

(51) Int. Cl.
*G05B 13/04*    (2006.01)
*G05B 15/02*    (2006.01)
(Continued)

(52) U.S. Cl.
CPC ............. *G05B 13/04* (2013.01); *G05B 15/02* (2013.01); *G05B 19/042* (2013.01); *G06Q 10/04* (2013.01);
(Continued)

(58) Field of Classification Search
CPC .. G05B 13/048; G05B 19/042; G05B 19/418; G05B 19/41885; G05B 13/04;
(Continued)

(56) References Cited

U.S. PATENT DOCUMENTS 6,968,295 B1 * 11/2005 Carr .................. G06Q 10/06
709/224
7,216,021 B2    5/2007 Matsubara et al.
(Continued)

FOREIGN PATENT DOCUMENTS

CA    2856887 C  *  6/2021 ........ H02J 13/00022
CN    102822639 A  * 12/2012 ............. G01D 4/004
(Continued)

OTHER PUBLICATIONS

International Search Report (with English Translation) and Written Opinion dated Oct. 27, 2020 issued in Application No. PCT/KR2020/008191.

*Primary Examiner* — Crystal J Barnes-Bullock
(74) *Attorney, Agent, or Firm* — KED & ASSOCIATES, LLP

(57) ABSTRACT

Provided is a building equipment energy control system, the system including: a library configured to receive information on an equipment unit from a DDC device controlling a plurality of equipment units installed in a building, and store the received information; a modeling module configured to retrieve information on the equipment unit from the library and perform simulation modeling for the equipment unit to calculate energy usage; a control module configured to generate a control command for the equipment unit based on the energy usage calculated by the modeling module and provide the control command to the DDC device; and a correction module configured to calculate an error rate between actual energy usage of the equipment unit and the calculated energy usage and correct information on the
(Continued)

equipment unit. Therefore, it is possible to derive an optimized control set value for each equipment unit by performing simulation modeling for various equipment units, so that energy saving performance and operating efficiency of the equipment units can be increased. In addition, by providing equipment performance information and equipment operation information for each equipment unit to a library in a modeling process, it is possible to optimize a control according to product specifications and operating characteristics of each equipment unit.

16 Claims, 14 Drawing Sheets

(51) Int. Cl.
  *G05B 19/042* (2006.01)
  *G06Q 10/04* (2023.01)
  *G06Q 50/06* (2012.01)
  *G06Q 50/10* (2012.01)
  *G06Q 50/163* (2024.01)
(52) U.S. Cl.
  CPC .............. *G06Q 50/06* (2013.01); *G06Q 50/10* (2013.01); *G06Q 50/163* (2013.01); *G05B 2219/2639* (2013.01)
(58) Field of Classification Search
  CPC ...... G05B 15/02; G06F 1/3206; G06Q 10/04; G06Q 50/06; G06Q 50/10; G06Q 50/163
  USPC .................................................. 700/291, 295
  See application file for complete search history.

(56) References Cited

U.S. PATENT DOCUMENTS

| | | | | |
|---|---|---|---|---|
| 8,880,224 | B2 * | 11/2014 | Eaton | G05B 15/02 700/282 |
| 9,298,203 | B2 * | 3/2016 | Wenzel | G05F 1/66 |
| 9,634,508 | B2 * | 4/2017 | Kearns | H02J 3/00 |
| 9,817,379 | B2 * | 11/2017 | Krinkel | G05B 15/02 |
| 9,983,653 | B2 * | 5/2018 | Lee | G05B 19/042 |
| 10,088,887 | B2 * | 10/2018 | Lyu | G06F 1/3206 |
| 10,156,834 | B2 * | 12/2018 | Lyu | G05B 13/048 |
| 10,325,331 | B2 * | 6/2019 | Drees | G01R 21/00 |
| 10,466,662 | B2 * | 11/2019 | Kaufman | G05B 19/4183 |
| 10,756,543 | B2 * | 8/2020 | Detmers | H02J 3/32 |
| 11,385,605 | B2 * | 7/2022 | Wenzel | H04L 43/0811 |
| 11,473,796 | B2 * | 10/2022 | Dempster | F24F 11/62 |
| 11,592,792 | B2 * | 2/2023 | Przybylski | G05B 13/047 |
| 11,699,903 | B2 * | 7/2023 | Elbsat | H02J 3/003 700/291 |
| 2010/0298993 | A1 * | 11/2010 | Eaton | G05B 13/00 700/282 |
| 2011/0246381 | A1 * | 10/2011 | Fitch | G06Q 50/06 703/2 |
| 2012/0253527 | A1 * | 10/2012 | Hietala | F24F 11/30 700/278 |
| 2016/0103442 | A1 | 4/2016 | Lyu et al. | |
| 2016/0103475 | A1 * | 4/2016 | Lee | G05B 19/41885 700/291 |
| 2018/0011454 | A1 * | 1/2018 | Kaufman | G05B 19/4183 |
| 2022/0284519 | A1 * | 9/2022 | Pancholi | G05B 19/042 |

FOREIGN PATENT DOCUMENTS

| | | | | |
|---|---|---|---|---|
| CN | 106295900 | | 1/2017 | |
| CN | 106485342 A | * | 3/2017 | ........... G06Q 30/018 |
| CN | 106797123 A | * | 5/2017 | ............. G05B 15/02 |
| JP | 2005158020 A | * | 6/2005 | ............. H02J 3/00 |
| JP | 2005276797 A | * | 10/2005 | ............. H01M 8/02 |
| JP | 2014-006011 | | 1/2014 | |
| JP | 2016-177675 | | 10/2016 | |
| KR | 100606501 B1 | * | 8/2006 | ............. H04L 12/24 |
| KR | 20150102547 A | * | 9/2015 | ............. F24F 11/02 |
| KR | 10-2016-0001378 A | | 1/2016 | |
| KR | 10-1589262 B1 | | 1/2016 | |
| KR | 10-2016-0042673 A | | 4/2016 | |
| KR | 101641254 B1 | * | 7/2016 | ........... G05B 19/418 |
| KR | 10-2016-0126609 A | | 11/2016 | |

* cited by examiner

BUILDING EQUIPMENT ENERGY MANAGEMENT CONTROL SYSTEM AND CONTROL THEREFOR

CROSS-REFERENCE TO RELATED PATENT APPLICATIONS

This application is a U.S. National Stage Application under 35 U.S.C. § 371 of PCT Application No. PCT/KR2020/008191, filed Jun. 23, 2020, which claims priority to Korean Patent Application No. 10-2020-0002647, filed Jan. 8, 2020, whose entire disclosures are hereby incorporated by reference.

TECHNICAL FIELD

The present disclosure relates to a building equipment energy management control system and a control method therefor, and more particularly, a building equipment energy management control system capable of performing energy management while controlling building equipment by a direct digital controller (DDC) and a control method therefor.

BACKGROUND ART

Recently, technologies for reducing greenhouse gas emissions are being developed in various aspects, such as energy saving, recycling of waste, or new energy development. In particular, since energy consumption in buildings is directly related to carbon emission, building energy management and saving technology is considered important.

Building Energy Management System (BEMS) is a system that efficiently manages energy consumption in a building by integrating construction technology, information and communication technology, and energy technology, and the BEMS can classify energy consumption in a building by use, and analyze and predict an energy pattern to control building equipment.

Meanwhile, in buildings such as office buildings, public institution buildings, or apartments, building equipment such as air conditioners, boilers, or pumps for controlling and maintaining temperature, humidity, or cleanliness of indoor air are provided and a system for controlling such building equipment is installed.

In particular, a related art (Korean Patent No. 10-1801631) has proposed a control method in which a BEMS unit analyzes operation data and indoor/outdoor environmental data to derive an optimal control target value for equipment operation and a DDC unit performs control to reach the target value.

However, this control method utilizes the indoor/outdoor environmental data and BEMS energy analysis data and performs control based on analysis of past operations but does not take into consideration equipment operation performance, and accordingly, an operator's operation practice is repeated. In addition, this related art is not appropriate for energy management because it is not possible to quantitatively figure out the amount of energy to be saved through an optimal operation.

PRIOR ART LITERATURE

Patent Literature

Korean Patent No. 10-1801631 (Registration Date: Nov. 21, 2017)

DISCLOSURE

Technical Problem

A first objective of the present disclosure is to provide a building equipment energy management system in which an optimized control set value for each equipment unit may be derived by performing each simulation modeling for various equipment units.

In particular, a second objective of the present disclosure is to provide a building equipment energy management system capable of performing an optimal control according to product specifications and operating characteristics of each equipment unit by providing equipment performance information and equipment operation information on each equipment unit to a library in the above-described modeling process.

In addition, a third objective of the present disclosure is to provide a control system capable of calculating energy savings in real time through a model prediction-based optimal control.

Further, a fourth objective of the present disclosure is to provide a control system capable of updating optimized equipment performance information by calculating an error between predicted energy usage and measured actual energy usage and performing analysis based on the calculated error to correct performance information on each equipment unit.

Technical Solution

A building equipment energy control system is provided, and the system including: a library configured to receive information on an equipment unit from a DDC device controlling a plurality of equipment units installed in a building, and store the received information; a modeling module configured to retrieve information on the equipment unit from the library and perform simulation modeling for the equipment unit to calculate energy usage; a control module configured to generate a control command for the equipment unit based on the energy usage calculated by the modeling module and provide the control command to the DDC device; and a correction module configured to calculate an error rate between actual energy usage of the equipment unit and the calculated energy usage and correct information on the equipment unit.

The information on the equipment unit may include performance information and operation information on the equipment unit.

The modeling module may calculate the energy usage of the equipment unit by using a specific simulation model that is set for the equipment unit.

The simulation model may be set to correspond to a type of the equipment unit.

When a specific equipment unit is selected, the modeling module may retrieve performance information, setting information, and input variables for the selected specific equipment unit and calculate output variables by using the simulation model for the equipment unit.

The modeling module may include energy usage and operating efficiency as the output variables.

The control module may receive the energy usage calculated by the modeling module, and calculates an optimization set value for the equipment unit based on an objective function and a constraint condition.

The optimization set value is defined as a set value having minimum energy usage as a result of multiple times of simulation for the equipment unit.

The correction module may include: an energy savings calculation module configured to calculate a difference between the actual energy usage of the equipment unit and minimum energy usage calculated by the control module, and a performance information correction module configured to correct minimum energy usage information on the equipment unit, which is stored in the library, when an error rate of energy saving exceeds an allowable range.

The performance information correction module may select an optimal probability distribution from among a plurality of sample distributions with respect to an operation pattern of the equipment unit, perform data sampling on the optimal probability distribution, and discover optimal performance information within a constraint condition by using sampled data.

The performance information correction module may discover the optimal performance information by using an optimization method of a nonlinear multi-variable function with the constraint condition.

The building equipment may include any one of an electric refrigerator, an absorption-type hot/cold water dispenser, an air-conditioner, a variable refrigerant flow (VRF) air conditioning system, a boiler, and an indoor temperature measuring device.

A building equipment energy control method is provided, and the method includes: receiving information on equipment units from DDC devices that control a plurality of equipment units installed in a building, and performing simulation modeling for the equipment unit to calculate energy usage; generating a control command for the equipment unit based on the calculated energy usage and providing the control command to the DDC device; and calculating an error rate between actual energy usage of the equipment unit and the calculated energy usage, and energy savings, and correcting information on the equipment unit.

The information on the equipment unit may include performance information and operation information on the equipment unit.

In the modeling, the energy usage of the equipment unit may be calculated by using a simulation model that is set to correspond to a type of the equipment unit.

In the modeling, when a specific equipment unit is selected, performance information, setting information, and input variables for the selected specific equipment unit may be retrieved and output variables including the energy usage and operation efficiency may be calculated by using the simulation model for the equipment unit.

In the controlling, the calculated energy usage may be received, and an optimization set value of the equipment unit may be calculated based on an objective function and a constraint condition.

The optimization set value may be defined as a set value having minimum energy usage as a result of multiple times of simulation for the selected equipment unit.

The correcting may include: an energy saving calculation operation of calculating a difference between the actual energy usage of the equipment unit and minimum energy usage calculated by the control module as the calculated energy savings; and a performance information correcting operation of correcting the minimum energy usage of the equipment unit, which is stored in a library, when the error rate of the energy savings exceeds an allowable range.

The building equipment energy control method may further include: transmitting information on the energy usage and the energy savings for the equipment unit to an operator terminal.

Advantageous Effects

Through the above solution, the present disclosure may enable simulation modeling for various equipment units to derive an optimized control set value for each equipment unit, so that energy saving performance and equipment operating efficiency can be increased.

In addition, by providing equipment performance information and equipment operation information for each equipment unit to a library in a modeling process, it is possible to optimize a control according to product specifications and operating characteristics of each equipment unit. In addition, it is possible to calculate energy savings in real time through a model prediction-based optimal control and manage the energy savings as a history. In addition, the optimized equipment performance information may be updated by calculating an error between predicted energy usage and measured actual energy usage and performing an analysis based on the calculated error to correct equipment performance information of each equipment unit.

MODE FOR DISCLOSURE

The "forward(F)"/"rearward(R)"/"leftward(Le)"/"rightward(Ri)"/"upward(U)"/"downward(D)" directions set forth herein are defined as shown in drawings. However, these directions are used merely to clearly describe the present disclosure, and the above directions may be differently defined as needed.

Hereinafter, terms such as "first" and "second" are used herein for purposes of description and are not intended to indicate or imply relative sequence, importance, or significance. For example, the present disclosure may include only a second element without a first element.

Hereinafter, a building equipment energy control system will be described with reference to FIGS. 1 to 2.

Figure 1:
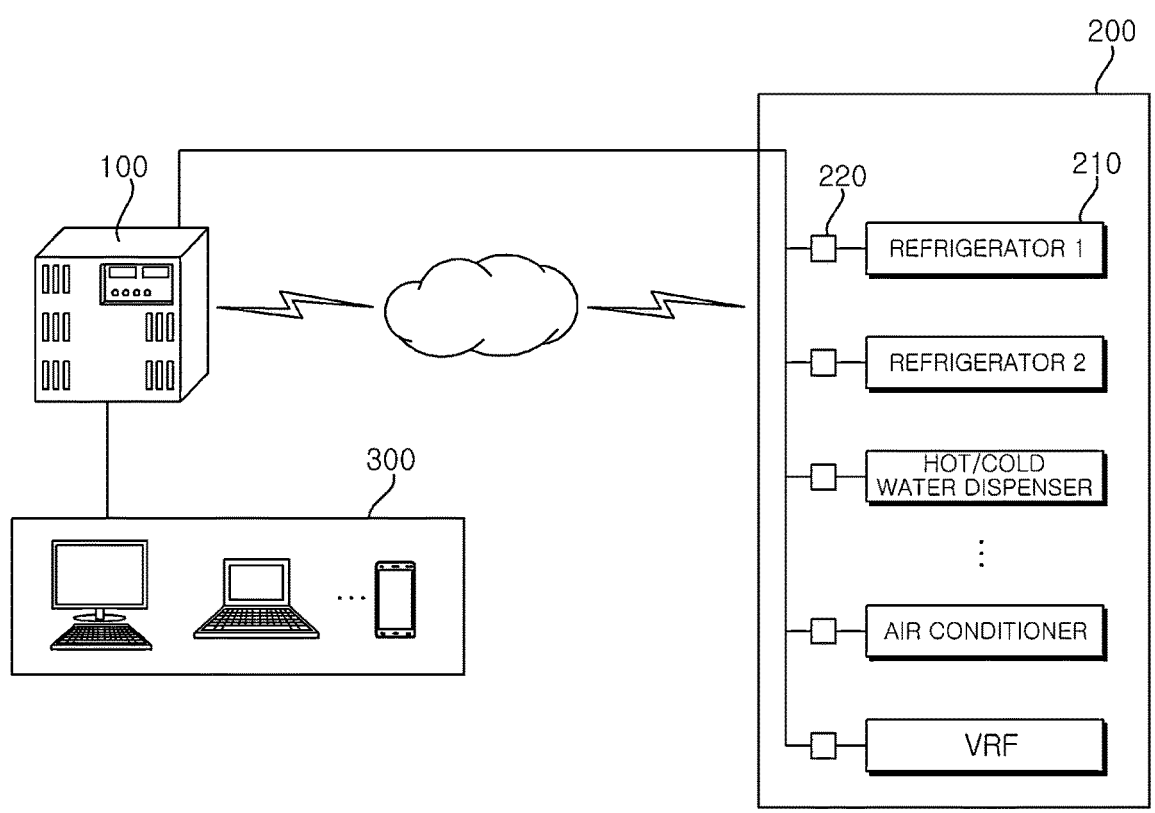
FIG. 1 is an overall configuration diagram including a building equipment energy control system according to an embodiment of the present disclosure.
Figure 2:
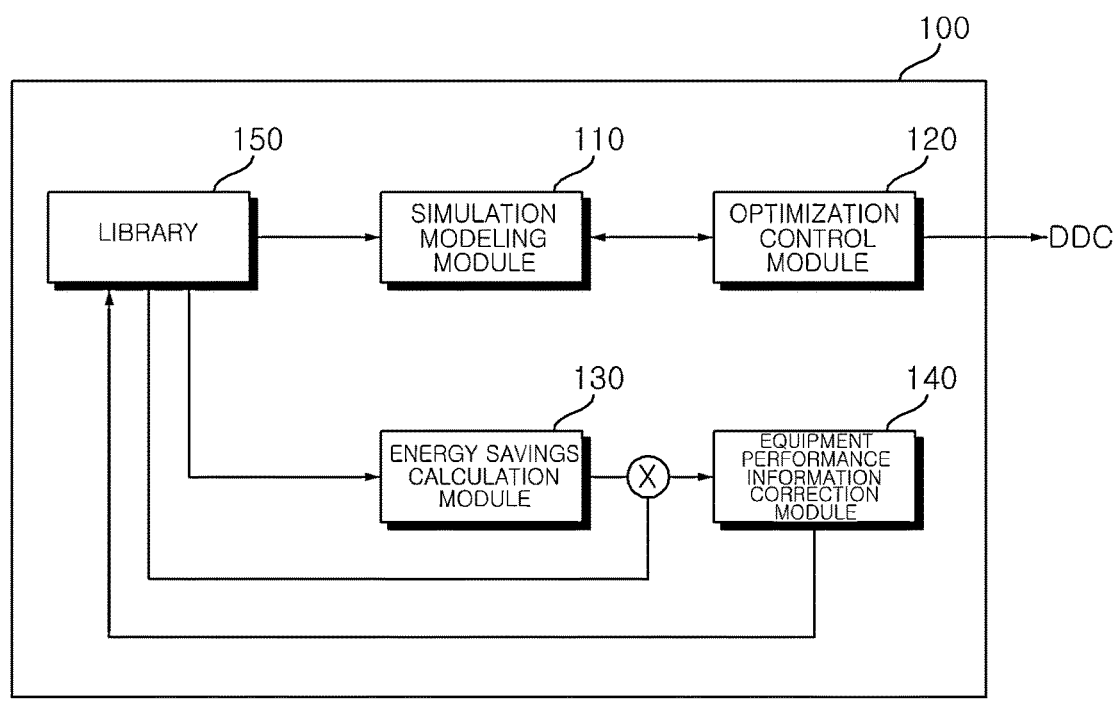
FIG. 2 is a block diagram of the building equipment energy control system of FIG. 1.

FIG. 1 is an overall configuration diagram including a building equipment energy control system 100 according to an embodiment of the present disclosure, and FIG. 2 is a configuration diagram of the building equipment energy control system 100 of FIG. 1.

Referring to FIG. 1, the entire system including the building equipment energy management control system 100 includes a plurality of equipment units installed in a building 200, an operator terminal 300, and the building equipment energy management system 100.

The building equipment energy management system 100 is connected to a plurality of equipment units 210 installed in the building 200 to monitor the status of each of the equipment units 210, and analyzes the status to perform energy management.

In addition, the building equipment energy management system 100 of the present disclosure may control the plurality of equipment units to operate in an optimized manner, while performing energy management for the plurality of equipment units.

That is, the building equipment energy management system 100 of the present disclosure may be defined as an integrated system in which an existing building energy management system (BEMS) and a building control system (BMS) are combined.

The equipment units 210 in the building 200 according to an embodiment of the present disclosure may include a plurality of refrigerators, hot/cold water dispensers, air-conditioners, and the like, and, more specifically, the equipment units 210 may include electric refrigerators, absorption-type hot/cold water dispensers, air-conditioners, variable refrigerant flow (VRF) air-conditioning systems, boilers, indoor thermometers, and the like.

The plurality of various equipment units 210 may include direct digital controller (DDC) devices 220 for controlling the respective equipment units.

Each DDC device 220 may be installed at a site where a corresponding equipment unit 210 is located, so that operation control, monitoring, and use history management of the various equipment units 210 can be performed.

Each DDC device 220 may have an IP-based web browser DDC function, and may transmit and receive usage history management information and monitoring/control information on a corresponding equipment unit 210 through communication with the building equipment energy management system 100.

Each DDC device 220 receives environmental data of the building 200 regarding a corresponding equipment unit from a sensor mounted at the corresponding equipment unit 210 or a sensor mounted in the corresponding DDC device 220, for example, an indoor environment sensor or an outdoor environment sensor, receives operation status data on the corresponding equipment unit, transmits the received environmental data of the building, the received operation status data, and a set operation condition to the building equipment energy management system 100, receives a control command from the building equipment energy management system 100, and controls an operation of the corresponding equipment unit 210 in accordance with the control command.

Meanwhile, the operator terminal 300 is a terminal which an operator in charge of overall management of the building equipment units 210 can access to control each of the equipment units 210, and the operator terminal 300 may be a terminal capable of wireless communication, for example, a smartphone, a PC, a notebook computer, and the like.

The operator terminal 300 may be installed with a building equipment management program provided by the building equipment energy management system 100, and by executing the building equipment management program, it is possible to check information on the current state of each equipment unit and set each variable.

In this case, when the operator terminal 300 is a smart phone, an application for the smart phone may be separately distributed/installed, and each equipment unit may be controlled upon execution of such a building equipment control application.

The building equipment energy management system 100 may have a configuration as shown in FIG. 2.

The building equipment energy management system 100 may be implemented as a processor including a plurality of functional blocks, and each functional block may be implemented as a separate integrated circuit.

The building equipment energy management system 100 includes a simulation modeling module 110 for performing simulation modeling for various equipment units, an optimal control module 120 for each equipment unit, an energy saving calculation module 130, an equipment performance information correction module 140, and a library 150.

In this case, the library 150 may be formed as a separate chip as a storage, but is not limited thereto. The library 150 may store operation history, performance information, setting information, and the like for each equipment unit, and a specific modeling algorithm for each equipment unit may be stored.

In addition, algorithm data for an optimal control may also be stored.

The simulation modeling module 110 is an equipment simulation modeling module 110 that mathematically expresses physical characteristics of a controller-based air conditioning and heating equipment unit. In the simulation modeling module 110, a vapor compression-type refrigerator, an absorption-type refrigerator, an absorption-type hot/cold water dispenser, a VRF model, an AHU model, an FCU model, etc. are modeled as each equipment unit. Equipment performance information required to set such models, for example, product specifications, operating characteristics, and the like, is provided from the library 150, and modeling may be performed by utilizing a performance curve-based model for each equipment unit.

Thus, each output variable such as energy usage, operating COP, and outlet temperature change may be calculated by applying a model for each equipment unit.

The model may utilize, for example, Energy Plus's performance curve, but the present disclosure is not limited thereto.

In this way, it is possible to calculate applicable output variables by inputting input variables and setting information as information on the currently operating equipment unit to a model for each equipment unit.

Meanwhile, the optimal control module 120 is an optimal control module 120 based on an air-conditioning system model, and may be executed by an algorithm for an optimal control, which is stored in a controller.

Such an optimal control algorithm is to derive a final set value, which minimizes a cost function, by repeatedly calculating an energy predicted value based on change of an operation set value through an equipment simulation model, and to transmit the final set value as a control command to a DDC device 220 of a corresponding equipment unit.

Meanwhile, the energy saving calculation module 130 calculates energy savings that are predicted upon application of a saving control, and the energy saving calculation module 130 calculates energy usage before and after application of the saving control by a model utilized through the simulation modeling module 119 so as to derive predicted energy savings.

In this case, a measured value of actual energy usage is used to adjust a default energy usage, which is a value of energy usage before the application of the energy saving control, so that the final default value can be derived.

Meanwhile, the equipment performance information correction module 140 monitors an error in a final equipment model in real time and corrects the simulation model through optimization.

Specifically, since errors may occur in the simulation model due to on-site operating conditions and environment, the simulation model may continuously monitor an error between a measurement value and an predicted value of energy usage and, and when an error rate of the two values exceeds a reference value, the equipment model performance information correction module 140 performs correction on equipment performance information.

Such correction may be performed by analyzing an operation pattern, extracting a representative sample, discovering equipment performance information optimized for on-site operation through a performance information optimization process, and updating existing information.

In this way, actual performance information and actual operation information of the currently operating equipment unit are applied to a simulation model for each of the plurality of equipment units, so that an optimized control with an accurate and low error rate is possible.

In addition, energy saving performance may be improved and operating efficiency of the equipment units may be improved through such a model prediction-based optimal control. In addition, such an energy saving effect may be predicted through modeling, and history management thereof may be performed.

Further, energy management and operation control may be simultaneously possible at very small costs compared to construction costs of a building energy management system or a building management system, thereby reducing costs.

Hereinafter, the operation of each functional module of the present disclosure will be described in detail with reference to FIGS. 3 to 14.

Figure 3:
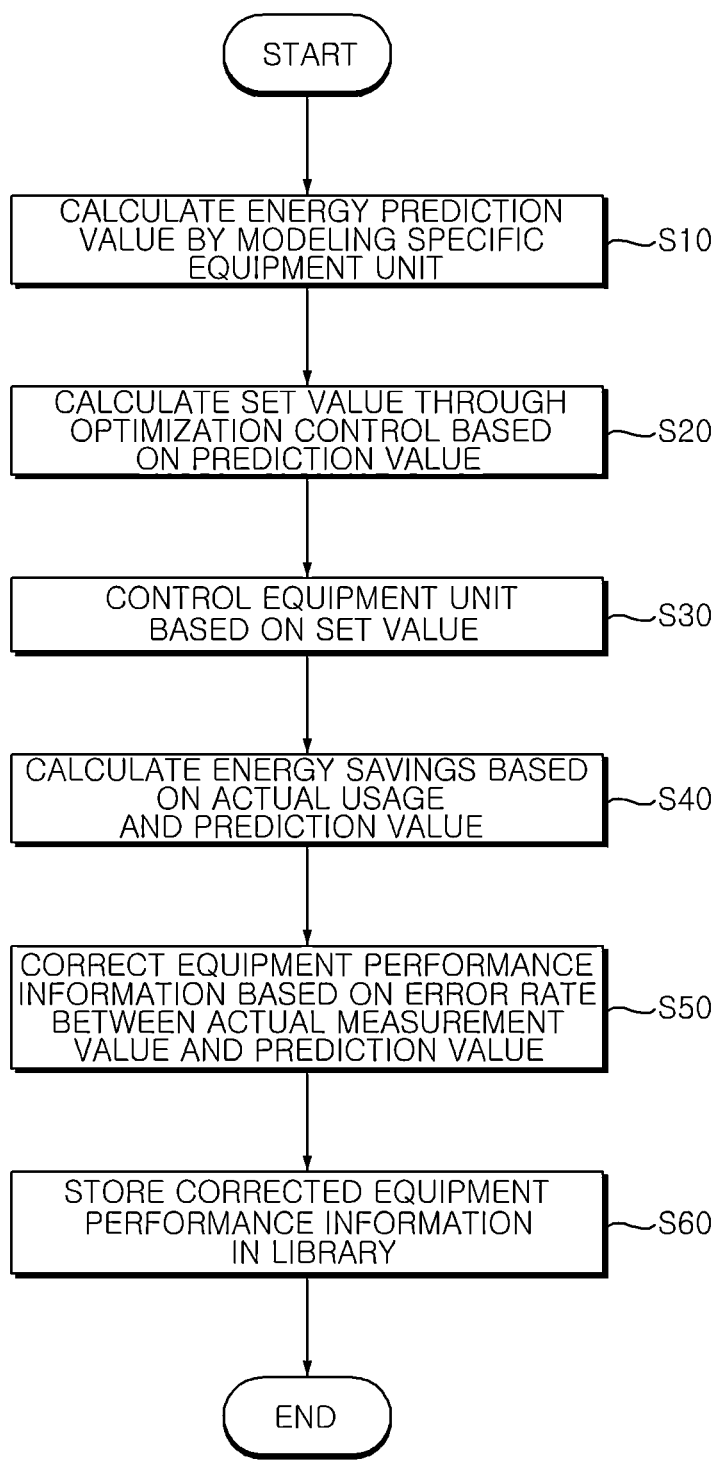
FIG. 3 is a flowchart illustrating a control method for the building equipment energy control system of FIG. 1.

FIG. 3 is a flowchart illustrating a control method for the building equipment energy control system 100 of FIG. 1.

Referring to FIG. 3, when a control command for a specific equipment unit is received from an operator module, a simulation modeling module 110 receives actual performance information on the corresponding equipment unit from a library 150 using an equipment simulation modeling module 110, which mathematically expresses physical characteristics of an equipment unit, and performs modeling in operation S10.

Through such modeling, an energy predicted value for the corresponding equipment unit is calculated.

Figure 4:
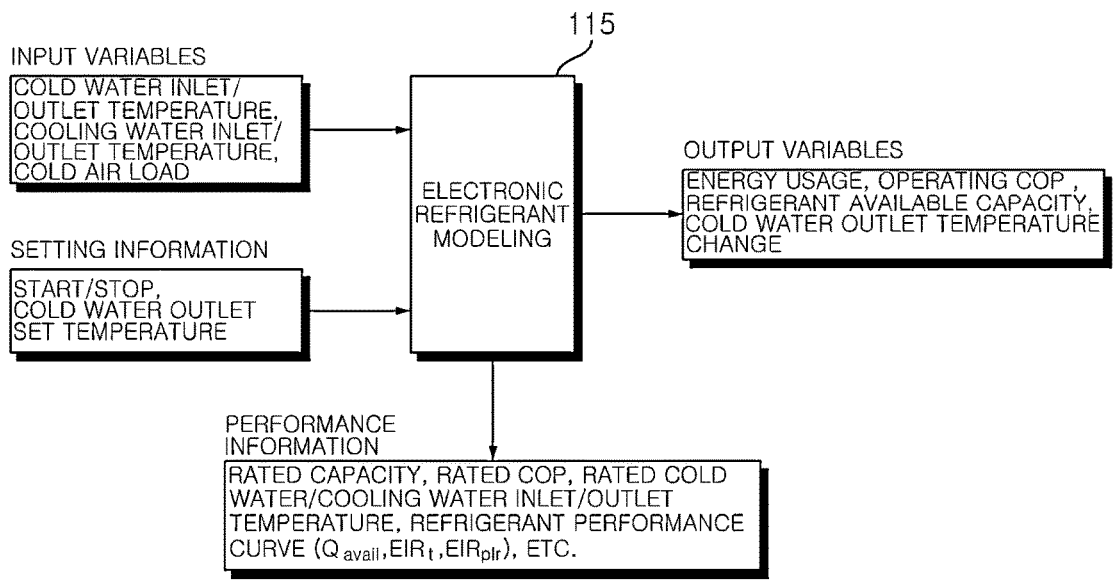
FIG. 4 is a modeling schematic diagram in a case where an equipment unit is an electric refrigerator.
Figure 5:
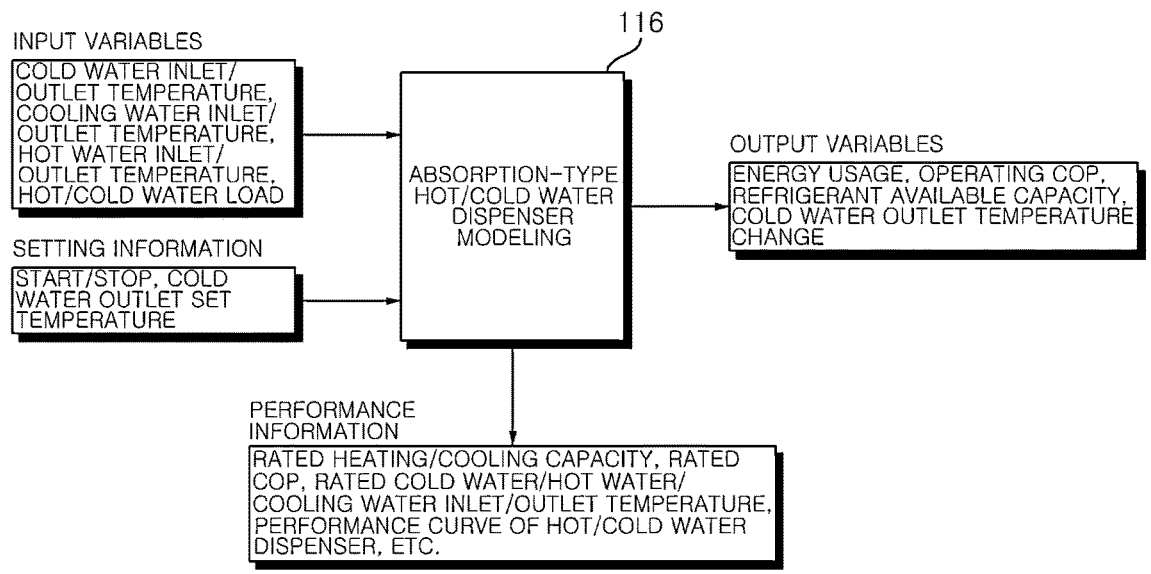
FIG. 5 is a modeling schematic diagram in a case where an equipment unit is an absorption-type hot/cold water dispenser.
Figure 6:
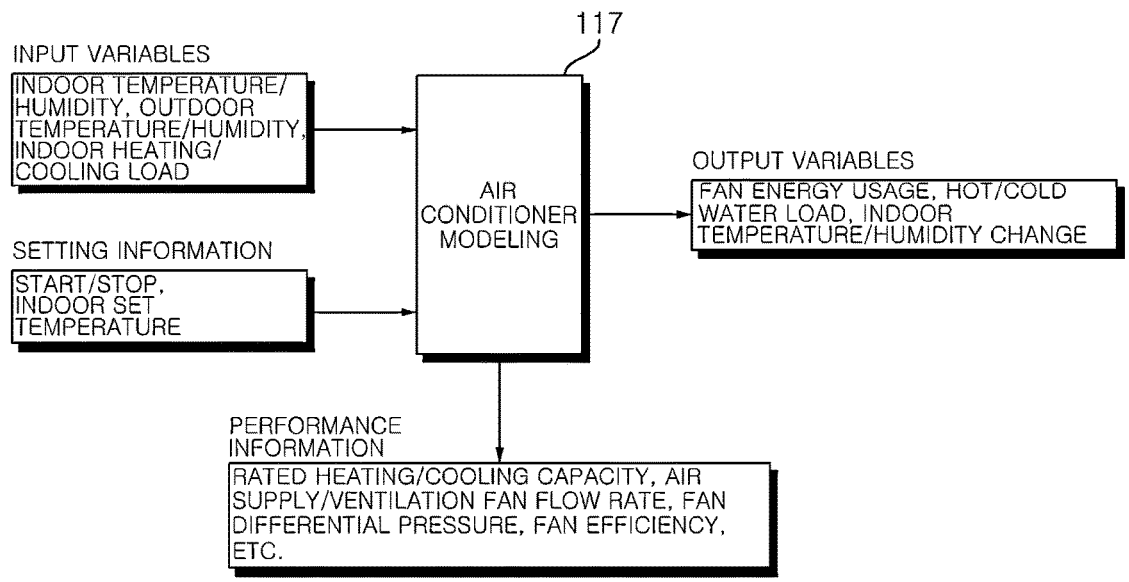
FIG. 6 is a modeling schematic diagram in a case where an equipment unit is an air conditioner.
Figure 7:
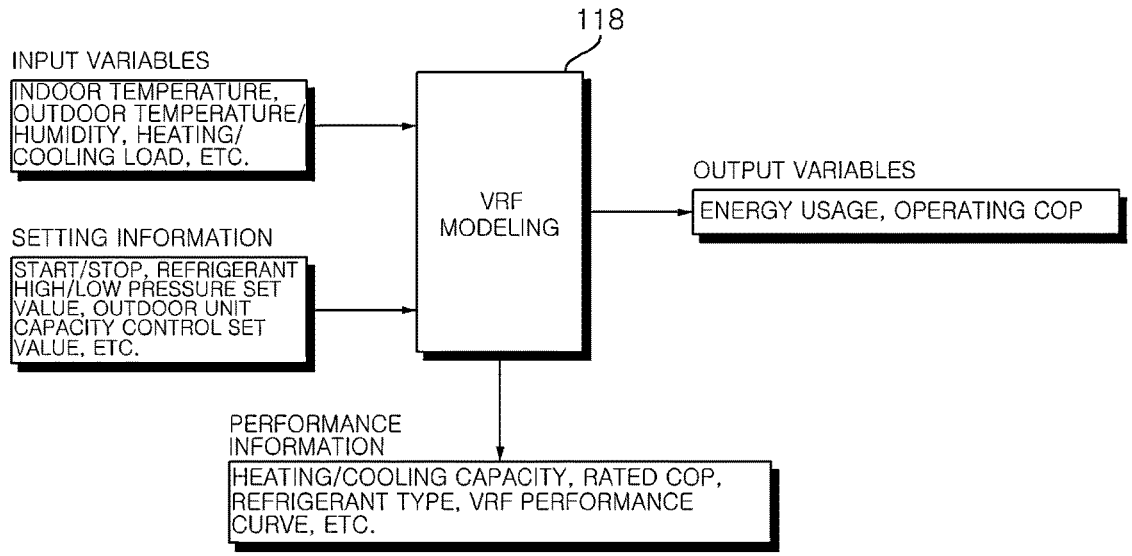
FIG. 7 is a modeling schematic diagram in a case where an equipment unit is a variable refrigerant flow (VRF) air-conditioning system.

FIG. 4 is a modeling schematic diagram in a case where an equipment unit is an electric refrigerator, FIG. 5 is a modeling schematic diagram in a case where an equipment unit is an absorption-type hot/cold water dispenser, FIG. 6 is a modeling schematic diagram in a case where an equipment unit is an air conditioner, and FIG. 7 is a modeling schematic diagram in a case where an equipment unit is a VRF system.

For example, upon receiving a simulation modeling start signal for an electric refrigerator from an operator terminal 300, setting information and performance information on the electric refrigerator installed in a building are retrieved from a library 150.

In this case, as shown in FIG. 4, the setting information may include start/stop information, cold water outlet set temperature, and the like, and the performance information may be a rated capacity, a rated COP (rated refrigerator efficiency), and a rated cold water/cooling water inlet/outlet temperature, refrigeration performance curves ($Q_{avail}$, $EIR_t$, $EIR_{plr}$, etc.), and the like.

In this case, information on cold water inlet/outlet temperature, information on cooling water inlet/outlet temperature, and information on a refrigerator load of the corresponding electric refrigerator are received as input variables from a DDC device 220 that controls the corresponding electric refrigerator.

Such modeling 115 may utilize an electric chiller model based on Energy Plus's performance curve, and an output variable may be calculated based on the following equation.

1. energy usage (refrigerator power)

$$P = Q_{avail}/COP_{ref} \circ EIR_t \circ EIR_{PLR}$$

2. cold water outlet temperature $$T_{cw,1} = T_{cw,e} - Q_{avail}/(m_{evap} \circ C_{p,evap})$$

3. cooling water outlet temperature $$T_{cond,1} = T_{cond,s} - Q_{cond}/(m_{cond} \circ C_{p,cond}) \qquad \text{[Equation 1]}$$

In this case, each variable may be defined as follows.
P: calculated refrigerator power value
$Q_{avail}$: refrigerator available capacity
$COP_{ref}$: rated COP
$EIR_t$: energy consumption performance factor according to cold water/cooling water temperature
$EIR_{plr}$: energy consumption performance factor according to load rate
$T_{cw,1}$: cold water outlet temperature [° C.]
$T_{cw,e}$: cold water inlet temperature [° C.]
$T_{cond,1}$: cooling water outlet temperature [° C.]
$T_{cond,e}$: cooling water inlet temperature [° C.]
$m_{evap}$: cold water mass flow rate [kg/s]
$C_{p,evap}$: cold water specific heat [J/kg° C.]
$m_{cond}$: cooling wafer mass flow rate [kg/s]
$c_{p,comd}$: cooling water specific heat [J/kg° C.]

As an output variable calculated by applying the corresponding equation through modeling using the above-described model, energy usage P is calculated into a predicted value.

Meanwhile, as shown in FIG. 5, when an equipment unit of an absorption-type hot/cold water dispenser is selected by an operator terminal 300 and a modeling command therefor is received, a simulation modeling module 110 retrieves setting information and performance information on the absorption-type hot/cold water dispenser installed in a corresponding building from the library.

In this case, the setting information may include start/stop information, cold water outlet set temperature, and the like, and the performance information may be a rated capacity, a rated COP (rated refrigerator efficiency), and a rated cold water/cooling water inlet/outlet temperature, refrigeration performance curves ($Q_{avail}$, $EIR_t$, $EIR_{plr}$, etc.), and the like.

In this case, information on cold water inlet/outlet temperature, information on cooling water inlet/outlet temperature, information on hot water inlet/outlet temperature, and information on hot/cold water load of the corresponding absorption-type hot/cold water dispenser are received as input variables from a DDC device 220 that controls the corresponding absorption-type hot/cold water dispenser.

Such modeling 116 may utilize an absorption-type refrigerator model based on Energy Plus's performance curve, and calculate energy usage, operating COP, cold water outlet temperature change, and the like of the corresponding equipment unit as output variables.

Meanwhile, when an equipment unit for an air conditioner is selected by the operator terminal 300 and a modeling command therefor is received, as shown in FIG. 6, the simulation modeling module 110 retrieves setting information and performance information on the air conditioner installed in a corresponding building from the library 150.

In this case, the setting information may be start/stop information, hot/cold water outlet set temperature information, and the like, and the performance information includes a rated heating/cooling capacity, an air supply/ventilation fan flow rate, a fan differential pressure, a fan efficiency, and the like.

In this case, information on indoor temperature/humidity, information on cold water outdoor air temperature/humidity, and information on indoor heating/cooling load of the corresponding air conditioner are received as input variables from a DDC device 220 that controls the corresponding air conditioner.

Such modeling 117 may utilize a fan/coil/air mixer model based on Energy Plus's performance curve, and calculate energy usage, hot/cold water load, indoor temperature and humidity change, and the like of the corresponding equipment unit as output variables.

In addition, when an equipment unit for a VRF air conditioning system shown in FIG. 7 is selected by the operator terminal 300 and a modeling command therefor is received, the simulation modeling module 110 retrieves setting information and performance information on the VRF air-conditioning system installed in a corresponding building from the library 150.

In this case, the setting information may be information on start/stop information, refrigerant high/low pressure set value, outdoor unit capacity control set value, and the like, and the performance information may include information on a heating/cooling capacity, a rated COP, a refrigerant type, a VRF performance curve, and the like.

In this case, information on indoor temperature, information on outdoor temperature/humidity, information on heating/cooling load, and the like of the VRF air-conditioning system are received as input variables from a DDC device 220 that controls the corresponding VRF air-conditioning system.

Such modeling 118 may utilize a VRF model based on Energy Plus's performance curve, and calculate energy usage and operating COP of the corresponding equipment unit calculated as output variables.

As described above, modeling is performed on a corresponding equipment unit selected by the operator terminal 300 to calculate a predicted value of energy usage of each equipment unit.

Next, a set value may be calculated based on the predicted value of energy usage through an optimal control in operation S20.

That is, the optimal control module 120 executes an optimization control algorithm, and a predicted value of energy usage is repeatedly calculated based on change of an operation setting value using an equipment simulation model to derive a final setting value that minimizes a cost function.

Hereinafter, an optimal control method according to an embodiment of the present disclosure will be described with reference to FIGS. 8 and 9.

Figure 8:
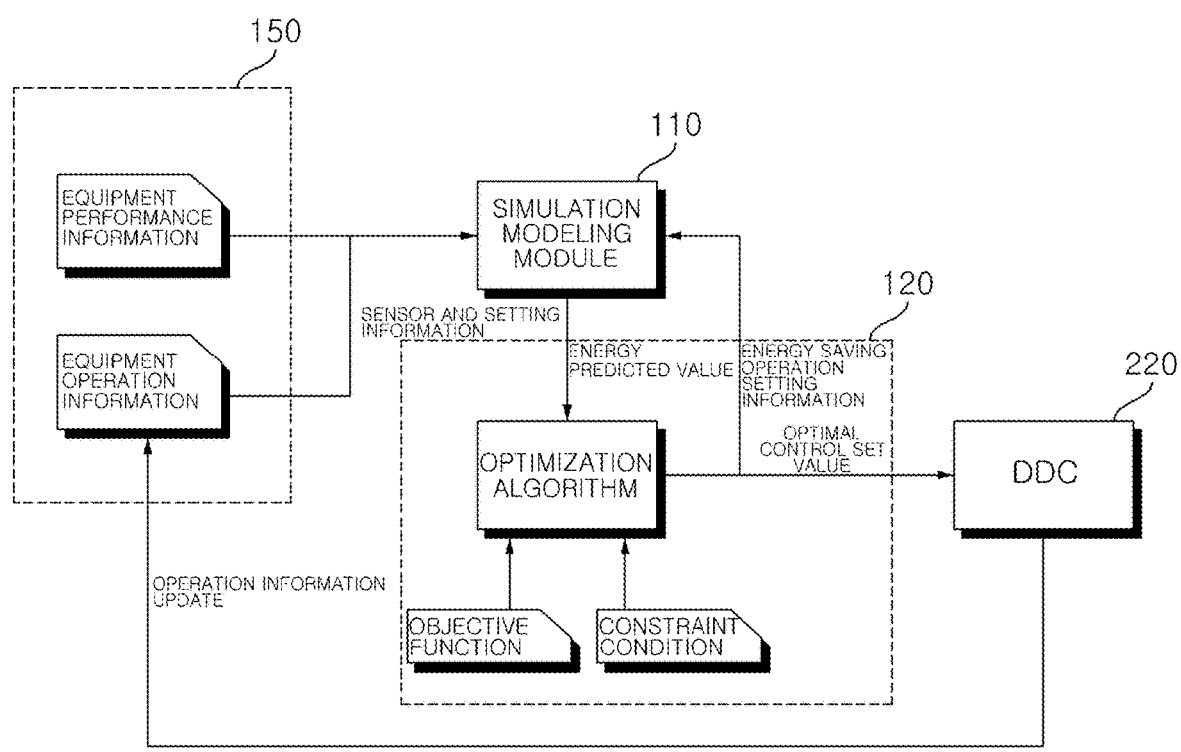
FIG. 8 is a configuration diagram for each function of an optimal control module of FIG. 1.
Figure 9:
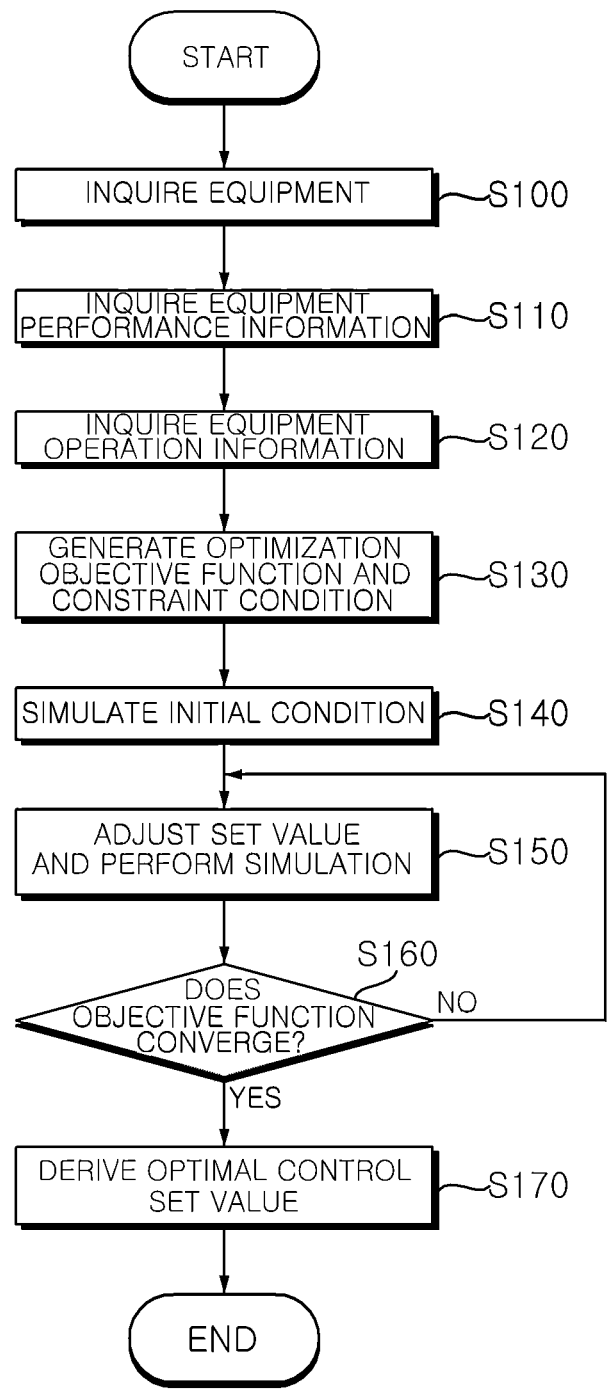
FIG. 9 is an operation flowchart of the optimal control module of FIG. 8.

FIG. 8 is a configuration diagram for each function of the optimal control module 120 of FIG. 1, and FIG. 9 is an operation flowchart of the optimal control module 120 of FIG. 8.

Referring to FIGS. 8 and 9, an optimal control module 120 executes an optimization algorithm to calculate an optimal control set value.

Specifically, information on selection of a specific equipment unit is received from an operator terminal 300.

Accordingly, in operation S100, the optimal control module 120 inquires what kind of equipment unit 210 a corresponding equipment unit 210 is, defines the corresponding equipment unit 210, and then retrieves equipment performance information and operation information of the corresponding equipment unit 210 from the library 150 in operations S110 and S120.

The optimal control module 120 generates an optimization objective function and a constraint condition based on the retrieved performance information and operation information of the corresponding equipment unit 210 in operation S130.

The objective function and the constraint condition may satisfy Equation 2 below.

$$\min f(x) = \sum_{i=1}^{j} g(x)_{sim,i} \quad \text{[Equation 2]}$$

$$\text{s.t.} \begin{bmatrix} 0.9 \text{ Load} \leq \Sigma \text{ Capacity}_{sim,i} < 1.1 \text{ Load} \\ T_{chout,set} - 1 \leq T_{chout,sim,i} < T_{chout,set} + 1 \end{bmatrix}$$

$g(x)_{sim,i}$ : energy usage simulation value of $i$-$th$ refrigerator $capacit_{y\,sim,i}$ : refrigerating capacity simulation value of $i$-$th$ refrigerator Load : freezing load $T_{chout,set,i}$ : cold water exit temperature of $i$-$th$ refrigerator $T_{chout,set}$ : cold water exit temperature setting of refrigerator In this case, min f(x) is defined as the objective function, and s.t. is defined as the constraint condition.

The objective function and the constraint condition are to derive a set value that exhibits the minimum energy usage according to simulation results for a plurality of equipment units 210. In the above Equation 2, an equipment unit is a refrigerator as an example, but not limited thereto.

As such, when the optimization objective function and the constraint condition are generated, simulation modeling is performed on an initial condition to calculate a set value therefor in operation S140.

When the set value for the initial condition is calculated, the set value is reflected in the simulation modeling module 110 to perform modeling again and an energy predicted value is calculated and applied to the optimization algorithm in operation S150.

Accordingly, the above operation is repeatedly performed until the objective function converges to a minimum value, and when the objective function converges to the minimum value in operation S160, the set value at this point is derived as an optimal control set value in operation S170.

Referring back to FIG. 3, by transmitting the derived optimal control set value as a control command to the DDC device 220 of the corresponding equipment unit, it is possible to control such that energy can be reduced to the maximum according to the final set value in operation S30.

Next, the building equipment energy control system 100 calculates energy savings through the above-described modeling and optimal control in operation S40.

Figure 10:
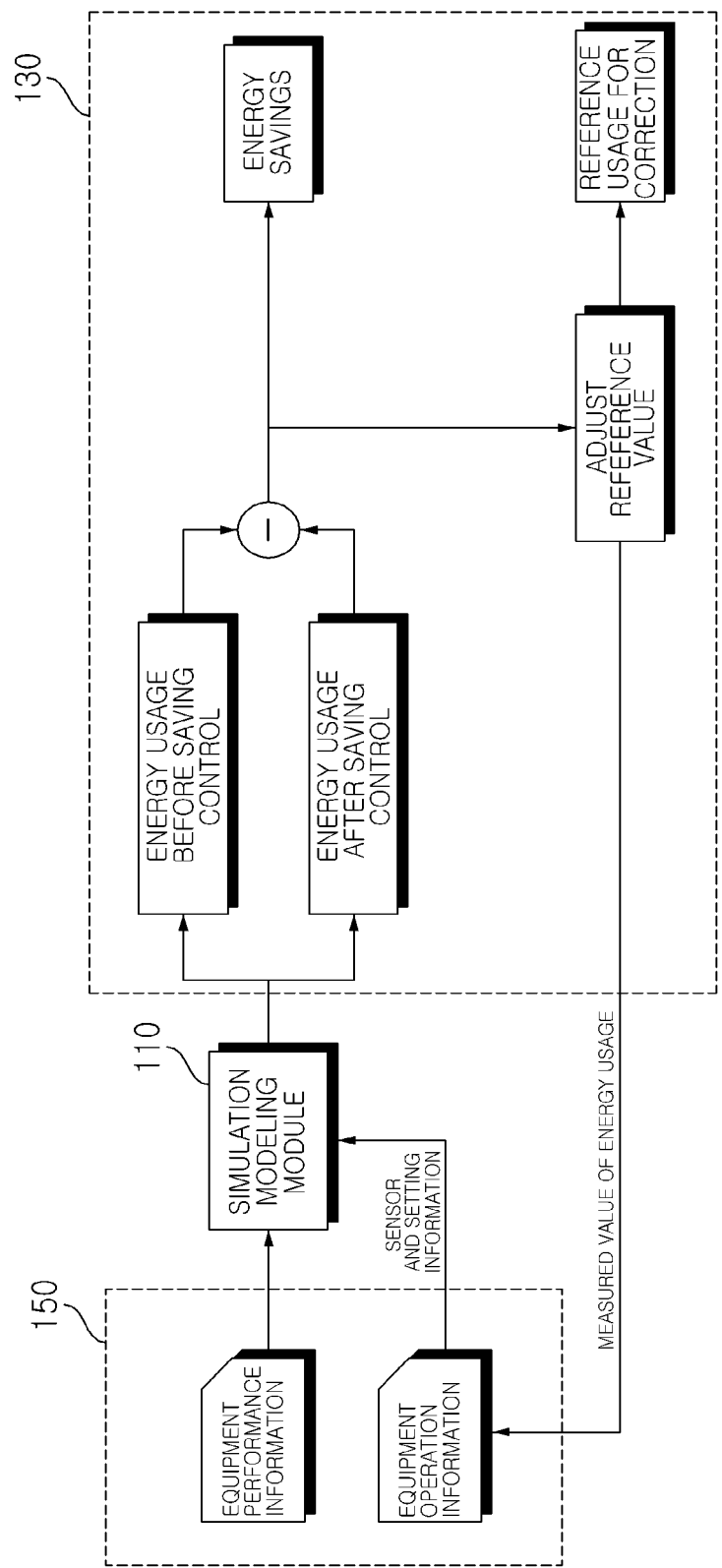
FIG. 10 is a functional block diagram of an energy savings calculation module of FIG. 1.
Figure 11:
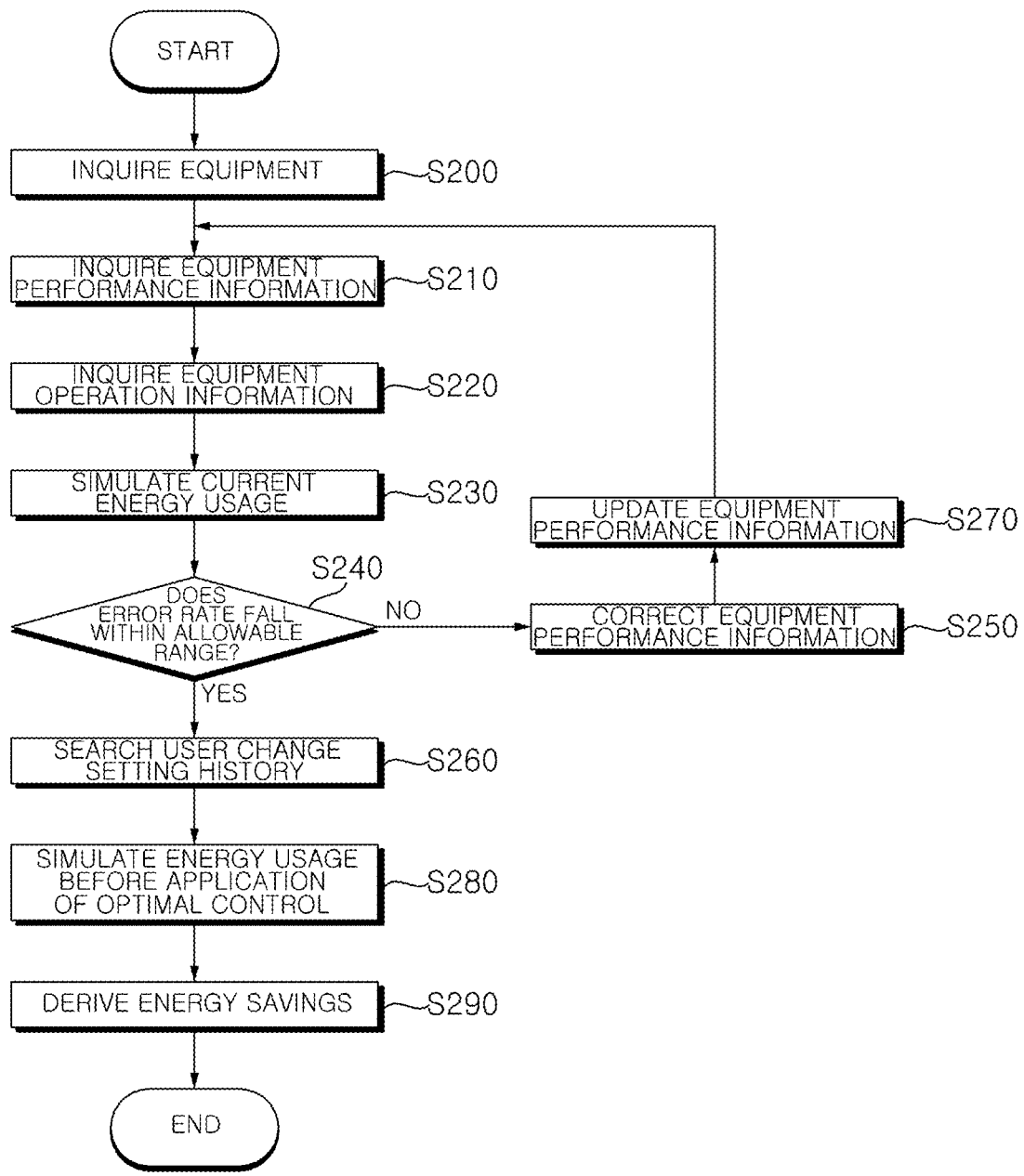
FIG. 11 is an operation flowchart of the energy savings calculation module of FIG. 10.

FIG. 10 is a configuration diagram for each function of the energy saving calculation module 130 of FIG. 1, and FIG. 11 is an operation flowchart of an energy savings calculation module 130 of FIG. 10.

Referring to FIGS. 10 and 11, the building equipment energy control system 100 calculates predicted energy savings according to application of a saving control in an energy savings calculation module 130.

Specifically, information on selection of a specific equipment unit 210 is received from an operator terminal 300.

Accordingly, in operation S200, the optimal control module 120 inquires what kind of equipment unit 210 a corresponding equipment unit 210 is, defines the corresponding equipment unit 210, and then retrieves equipment performance information and operation information on the corresponding equipment unit 210 from the library 150 in operations S210 and S220.

An energy usage predicted value is calculated based on the performance information and the operation information of the corresponding equipment unit, which are retrieved from the simulation modeling module 110, in operation S230.

With respect to the energy usage calculated as above, energy usage before and after the application of the saving control is calculated by a model utilized through a simulation modeling module 110 to derive predicted energy savings.

In this case, the energy usage before the application of the saving control refers to energy usage derived as a result of initial simulation modeling, and the energy usage after the application of the reduction control refers to energy usage having a final set value.

An error rate of the two energy usages is calculated, and when the error rate is less than a reference value, it is determined that the error rate falls within an allowable range in operation S240.

In this way, when the error rate falls within the allowable range, user change setting history is searched in operation S260, an energy usage simulation result before application of an optimal control is retrieved in operation S280, and energy savings, which is a difference from energy usage of the current final set value, is calculated in operation S290.

The energy savings are stored as a history and the process is terminated.

On the other hand, when the error rate is out of the allowable range, the equipment performance information is corrected and updated in the library 150 in operations S250 and S260.

Such correction of the equipment performance information will be described with reference to FIGS. 12 to 13C (S50).

Figure 12:
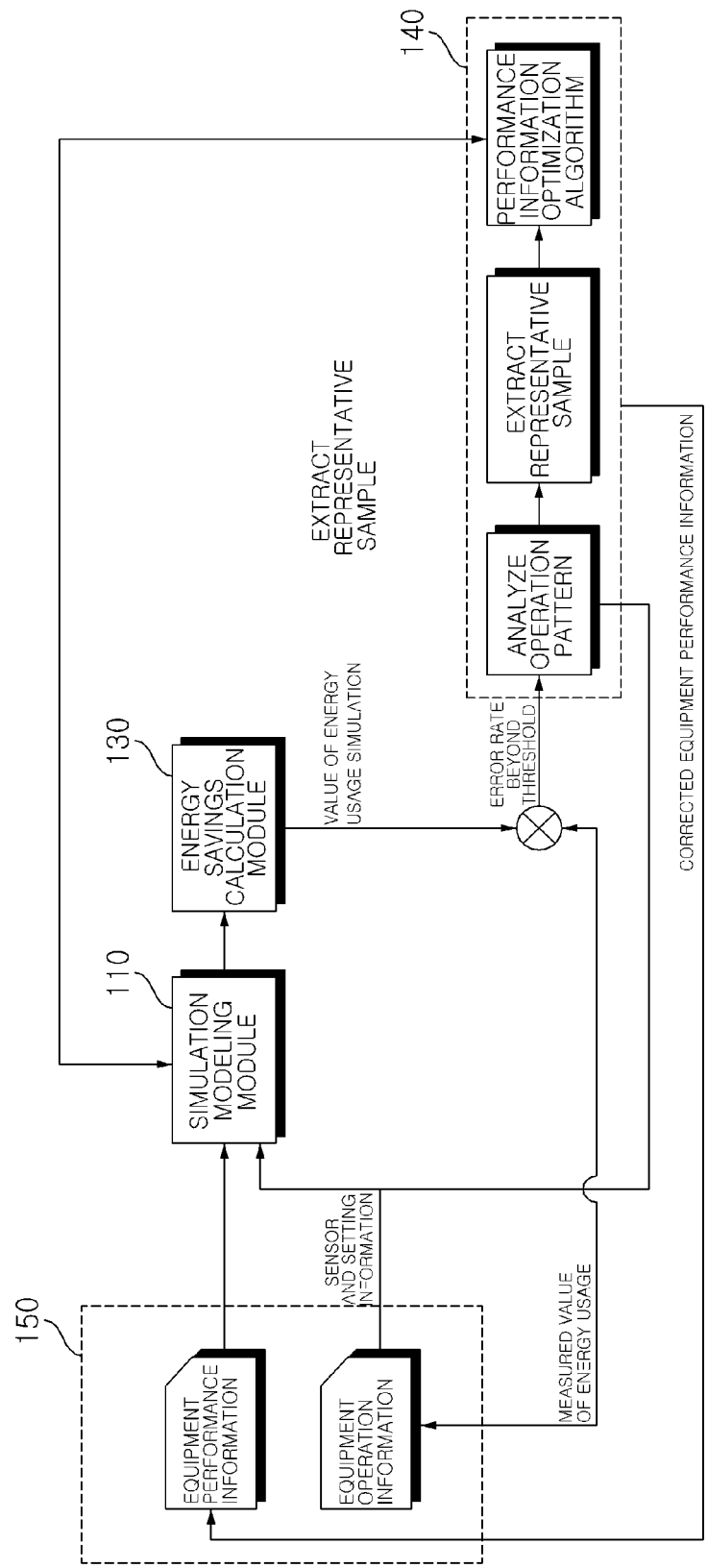
FIG. 12 is a configuration diagram for each function of an equipment performance information correction module.
Figure 13A:
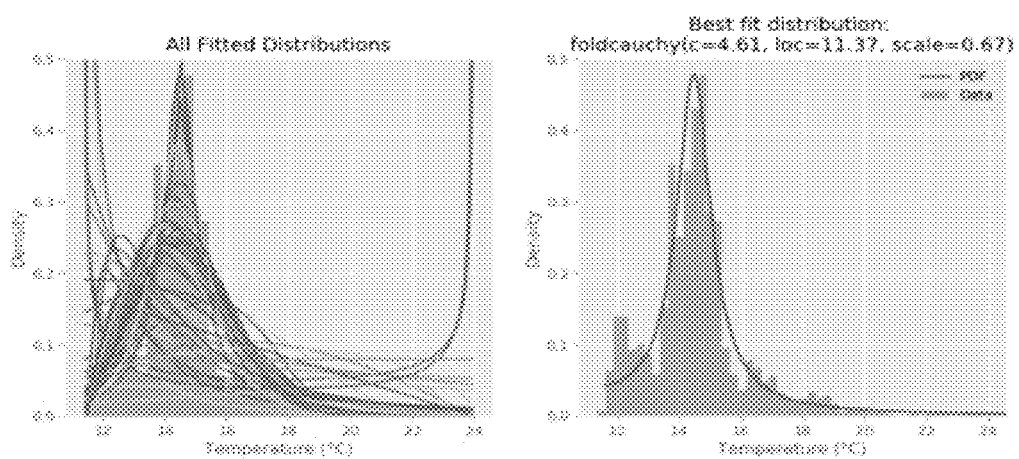
FIGS. 13A to 13C are graphs illustrating operations performed by each functional block of FIG. 12.
Figure 13B:
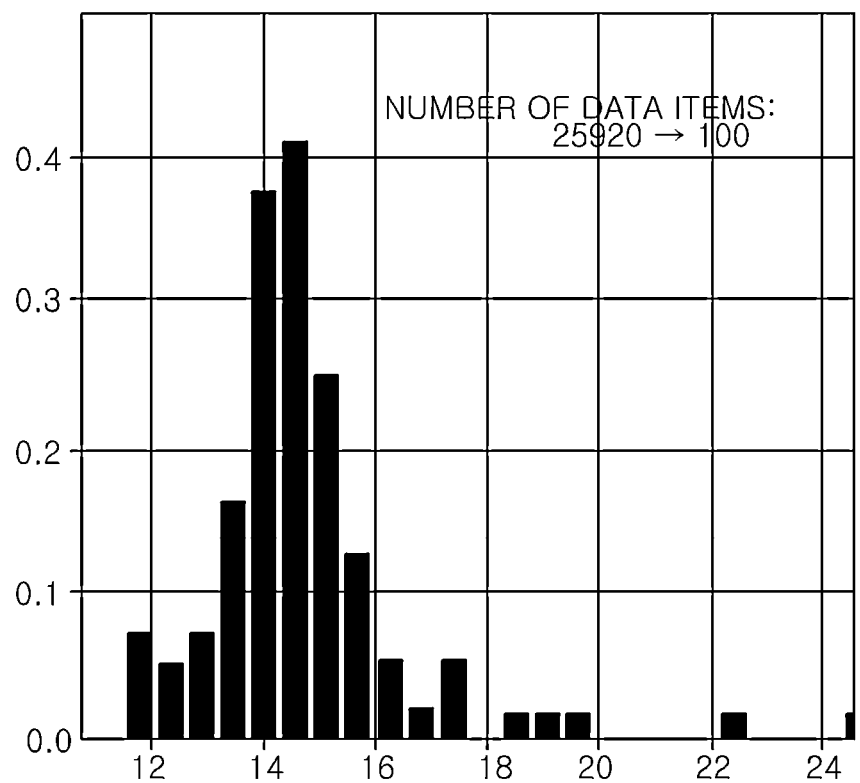
Figure 13C:
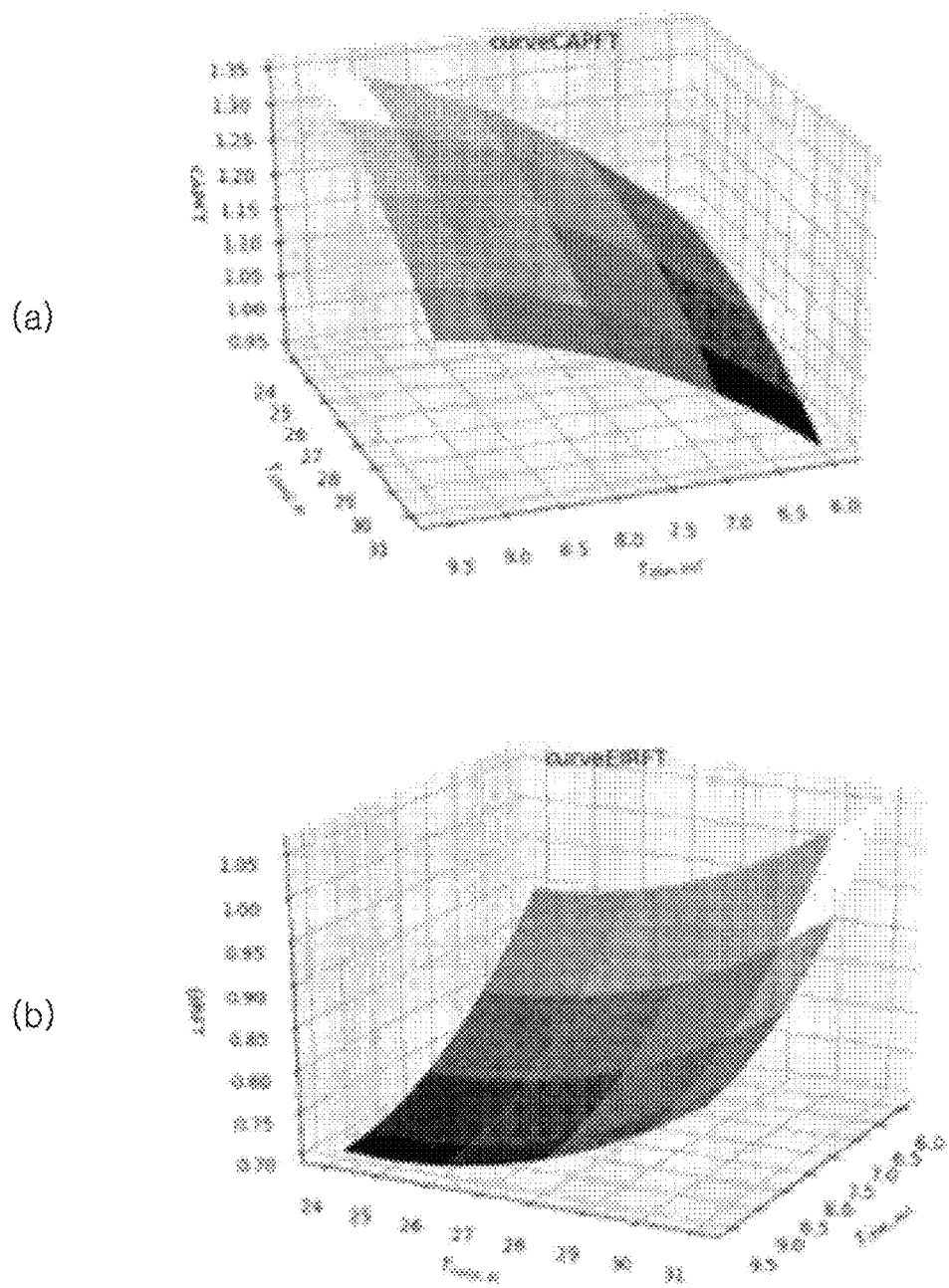

FIG. 12 is a configuration diagram for each function of an equipment performance information correction module 140, and FIGS. 13A to 13C are graphs illustrating operations performed by each functional block shown in FIG. 12.

As shown in FIG. 12, when an error rate calculated by the energy saving calculation module 130 exceeds the allowable range, the equipment model performance information correction module 140 corrects the equipment model performance information.

In this case, the library 150 receives information on a measured actual value of energy usage and sensor and setting information among equipment operation information, and performs the correction by using the received information.

Such correction refers to correcting a threshold value, which is energy usage before application of an energy saving control.

To this end, an operation pattern of the corresponding equipment unit is analyzed, a representative sample is extracted, and a performance information optimization algorithm is executed based on the corresponding sample to calculate energy usage.

Specifically, as shown in FIG. 13A, when the optimization is performed using all the history information, it takes a lot of time to perform iterative operations. Thus, as shown in FIG. 13A, optimal probability distributions for a sample distribution are searched and only one optimal probability distribution is selected.

A data sample as shown in FIG. 13B is extracted from the optimal probability distributions.

Such a data sample may be simulated by applying a sampling method that reflects characteristics of an optimal probability distribution as population among methods such as simple random sampling, systematic sampling, stratified sampling, and cluster sampling.

Through the above-described data sampling, the number of data items may be remarkably reduced as shown in FIG. 13B, and only a sampled data is used to apply the performance information optimization algorithm.

For the optimization algorithm, an optimization method of a nonlinear multi-variable function with a constraint condition as shown in FIG. 13C may be used, but the present disclosure is not limited thereto.

When a nonlinear multi-variable function with a constraint condition is applied as shown in FIG. 13C, the function and the constraint condition may satisfy Equation 3 below.

$$\min f(x) = \sum_{i=1}^{j} \sqrt{\frac{\sum_{k=1}^{n} (y_{meas,i,t} - g(x)_{sim,i,t})^2}{n}} \bigg/ \overline{y}_{i,meas} \quad \text{[Equation 3]}$$

$$\text{s.t.} \begin{bmatrix} 0 \le PLR_{min} < 0.5 \\ 0.5 \le PLR_{max} < 1.5 \\ 0.7 < \dot{m}_{ch,ref} \le \dot{m}_{ch,max} \le \dot{m}_{ch,ref} \\ 0.7\dot{m}_{cond,ref} \le \dot{m}_{cond,max} \le \dot{m}_{cond,ref} \\ 0.7\dot{m}_{hot,ref} \le \dot{m}_{hot,max} \le \dot{m}_{hot,ref} \end{bmatrix}$$

$g(x)_{sim,i,t}$ : energy usage simulation value of $i$-th refrigerator over time $t$ $y_{meas,i,t}$ : measured energy usage of $i$-th refrigerator over time $t$ $\overline{y}_{i,meas}$ : average measured energy usage of $i$-th refrigerator over $PLR_{min}$ : minimum partial load efficiency $PLR_{max}$ : maximum partial load efficiency $\dot{m}_{ch,ref}$ : rated cold water flow rate, $\dot{m}_{ch,max}$ : maximum cold flow rate, $\dot{m}_{cond,ref}$ : rated cooling water flow rate, $\dot{m}_{cond,max}$ : maximum cooling water flow rate $\dot{m}_{hot,ref}$ : rated hot water flow rate, $\dot{m}_{hot,max}$ : maximum hot water flow rate In Equation 3, min f(x) indicates an optimized nonlinear multi-variable function, and s.t. indicates a constraint condition.

When optimized energy usage is calculated by performing the above-described algorithm, a simulation initial value is corrected in a manner in which the optimized energy usage is corrected as a reference value and the corrected reference value is stored as energy usage of before application of a current energy saving control.

As such, the equipment performance information is stored and updated in the library 150, and may apply to a next simulation modeling in operation S60.

Figure 14:
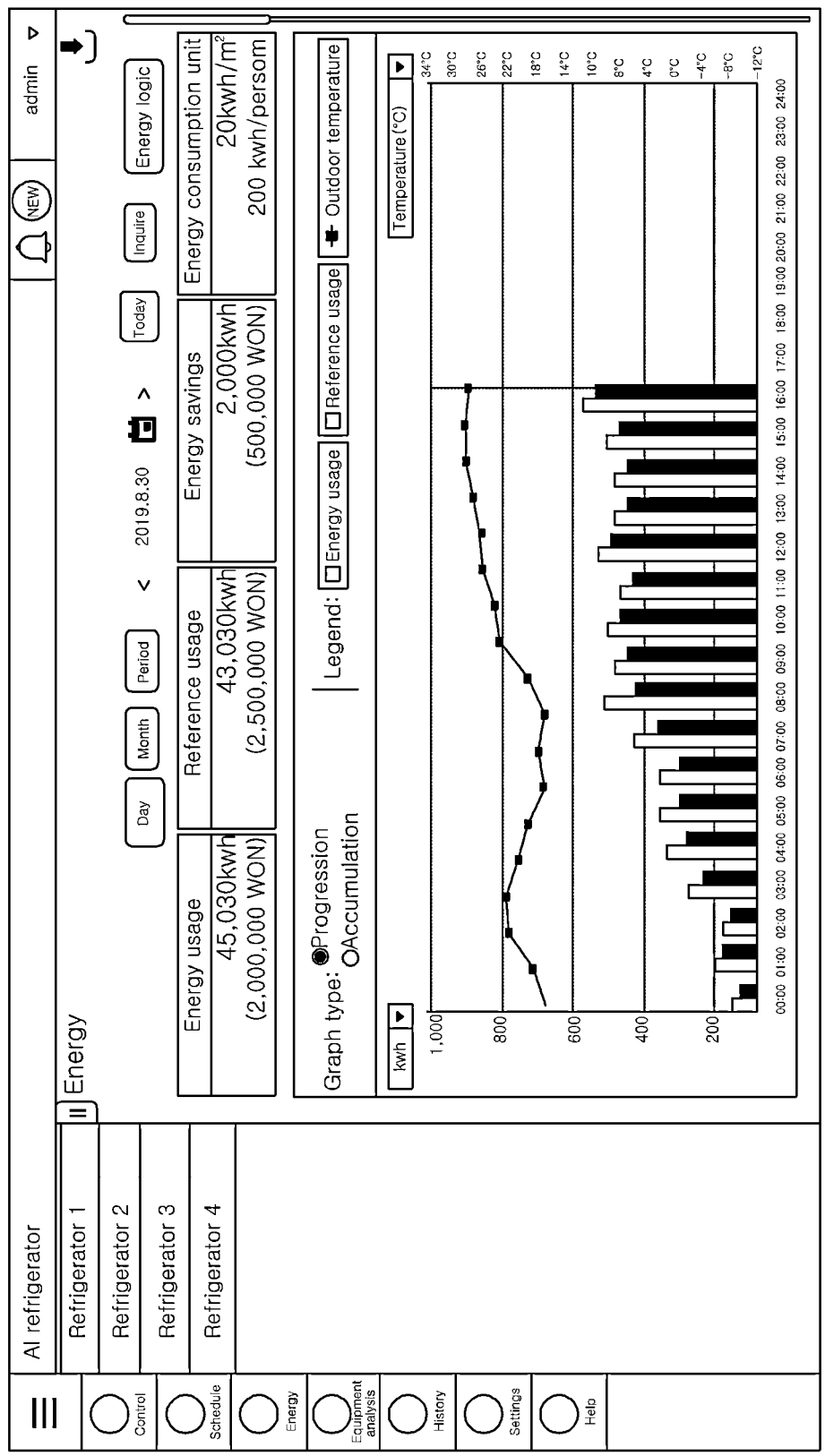
FIG. 14 is a diagram illustrating a management screen of the operator module of FIG. 1.

FIG. 14 is a diagram illustrating a management screen of the operator terminal 300 of FIG. 1.

As shown in FIG. 14, when icons for controlling various building equipment units 210 of a corresponding building exist in the operator terminal 300 and a specific equipment unit 210 is selected, for example, an artificial intelligence refrigerator is selected as shown in FIG. 14. In addition, when there is a plurality of refrigerators and a specific refrigerator is selected therefrom, energy management history regarding the selected refrigerator may be displayed.

As shown in FIG. 14, the energy management history may show used energy, reference usage, and energy savings on a unit basis of day/month/selected period, and may be provided in the form of a diagram.

In addition, as outdoor temperature of the refrigerator is provided in the diagram, visibility of correlation between temperature and energy may be improved.

In this case, control, schedule, equipment analysis, history, setting, and the like of a corresponding equipment unit may be provided based on selection icons disposed on the left side of FIG. 14.

As such, when a control command is received from the operator terminal 300, the building equipment energy control system 100 transmits an optimized control command to the DDC device 220 of a corresponding equipment unit, so that it is possible to perform an optimal control for energy saving in accordance with the control command from the operator terminal 300 while optimizing energy usage.

The building equipment energy management system 100 described above, which is merely a program, may be implemented as a controller installed in a building equipment energy management server to monitor power consumption and supply in real time, thereby enabling efficient power operation.

Exemplary embodiments of the present disclosure include a computer-readable medium including program instructions to perform operations implemented on a variety of computers. This medium stores a program for executing the above-described building equipment energy management control method. The medium may include program instruction, data file, data structure, and so on, either alone or in combination. An example of such medium includes a magnetic medium such as hard disk, floppy disk, and magnetic tape, an optical recording medium such as CD and DVD, a magneto-optical medium such as floptical disk, hardware device configured to store and implement program instructions such as ROM, RAM, flash memory, and so on. Examples of the program instructions include not only machine codes as generated by a compiler, but also high-level language codes implementable on a computer by using interpreter, and so on.

Although exemplary embodiments of the present disclosure have been described in detail above, the present disclosure is not limited thereto, and various changes and modifications made by a person with ordinary skill in the art using the basic concepts of the present disclosure as defined in the following claims are also within the scope of the present disclosure.

DETAILED DESCRIPTION OF MAIN ELEMENTS

| | |
|---|---|
| 100: building equipment energy management system | 110: simulation modeling module |
| 120: optimal control module | 130: energy savings calculation module |
| 140: equipment performance information correction module | 150: library |
| 200: building | 210: building equipment unit |
| 220: DDC device | 300: operator terminal |

The invention claimed is:

1. A building equipment energy control system comprising:
   a processor; and
   a non-transitory computer-readable memory to store instructions that, when executed by the processor, cause the processor to:
   maintain a library configured to receive, from a direct digital controller (DDC) device controlling a plurality of equipment units installed in a building, information on an equipment unit included in the plurality of equipment units, and to store the received information;
   retrieve information on the equipment unit from the library, and perform simulation modeling for the equipment unit based on the retrieved information to calculate energy usage for the equipment unit;
   generate a control command for the equipment unit based on the calculated energy usage, and provide the control command to the DDC device; and
   calculate an error rate between an actual energy usage of the equipment unit and the calculated energy usage, and correct the information on the equipment unit in the library based on the error rate,
   wherein the processor calculates an optimization set value for the equipment unit based on the energy usage, an objective function, and a constraint condition, and
   wherein the processor, when calculating the error rate between the actual energy usage of the equipment unit and the calculated energy usage and correcting the information on the equipment unit in the library, is further to:
   calculate a difference between the actual energy usage of the equipment unit and a minimum energy usage for the equipment unit, and
   correct minimum energy usage information on the equipment unit, which is stored in the library, when an error rate of energy saving exceeds an allowable range.

2. The building equipment energy control system of claim 1, wherein the information on the equipment unit received from the DDC comprises performance information and operation information on the equipment unit.

3. The building equipment energy control system of claim 2, wherein the processor calculates the energy usage of the equipment unit using a simulation model that is set for the equipment unit.

4. The building equipment energy control system of claim 3, wherein the processor sets the simulation model to correspond to a type of the equipment unit.

5. The building equipment energy control system of claim 4, wherein when the equipment unit is a specific equipment unit, the processor retrieves performance information, setting information, and input variables for the specific equipment unit and calculates output variables by using the simulation model for the equipment unit.

6. The building equipment energy control system of claim 5, wherein the processor, when performing simulation modeling for the equipment unit, calculates energy usage and operating efficiency as the output variables.

7. The building equipment energy control system of claim 1, wherein the processor defines the optimization set value as a set value having minimum energy usage as a result of multiple simulations of the equipment unit.

8. The building equipment energy control system of claim 1, wherein the processor, when correcting the minimum energy usage information on the equipment unit, selects an optimal probability distribution from among a plurality of sample distributions with respect to an operation pattern of the equipment unit, performs data sampling on the optimal probability distribution, and determines optimal performance information within a constraint condition by using sampled data.

9. The building equipment energy control system of claim 8, wherein the processor, when correcting the minimum energy usage information on the equipment unit, determines the optimal performance information by using an optimization method of a nonlinear multi-variable function with the constraint condition.

10. The building equipment energy control system of claim 1, wherein the equipment unit comprises one of an electric refrigerator, an absorption-type hot/cold water dispenser, an air-conditioner, a variable refrigerant flow (VRF) air conditioning system, a boiler, or an indoor temperature measuring device.

11. A building equipment energy control method comprising:
- receiving, by a processor, information on equipment units from direct digital controller (DDC) devices that control a plurality of equipment units installed in a building, and performing simulation modeling for an equipment unit among the plurality of equipment units to calculate energy usage for the equipment unit;
- generating, by the processor, a control command for the equipment unit based on the calculated energy usage, and providing the control command to the DDC device; and
- calculating, by the processor, an error rate, between an actual energy usage of the equipment unit and the calculated energy usage, and energy savings, and correcting information on the equipment unit based on the error rate and the energy savings,
- wherein generating the control command for the equipment unit based on the calculated energy usage includes calculating an optimization set value of the equipment unit based on the calculated energy usage, an objective function, and a constraint condition, and
- wherein correcting the information on the equipment unit comprises:
  - calculating a difference between the actual energy usage of the equipment unit and the minimum eneroy usage as the energy savings; and
  - correcting the minimum energy usage of the equipment unit when an error rate of the energy savings exceeds an allowable range.

12. The building equipment energy control method of claim 11, wherein the information on the equipment units received from the DDC devices comprises performance information and operation information on the equipment unit.

13. The building equipment energy control method of claim 12, wherein performing the simulation modeling for the equipment unit includes calculating the energy usage of the equipment unit using a simulation model that is set to correspond to a type of the equipment unit.

14. The building equipment energy control method of claim 13, wherein performing the simulation modeling for the equipment unit, when the equipment unit is a specific equipment unit, includes:
- retrieving performance information, setting information, and input variables for the selected specific equipment unit; and
- calculating output variables comprising the energy usage and operation efficiency using the simulation model for the equipment unit.

15. The building equipment energy control method of claim 11, wherein calculating the optimization set value of the equipment unit includes defining the optimization set value as a set value having minimum energy usage as a result of multiple simulations of the equipment unit.

16. The building equipment energy control method of claim 11, further comprising:
- transmitting information on the energy usage and the energy savings for the equipment unit to an operator terminal.

\* \* \* \* \*